United States Patent [19]

Narita

[11] Patent Number: 4,729,049
[45] Date of Patent: Mar. 1, 1988

[54] CASSETTE TAPE RECORDING AND REPRODUCING APPARATUS WITH COMPACT ARRANGEMENT OF MAGNETIC HEADS

[75] Inventor: Hisaya Narita, Tokyo, Japan
[73] Assignee: Sony Corporation, Tokyo, Japan
[21] Appl. No.: 753,569
[22] Filed: Jul. 10, 1985

[30] Foreign Application Priority Data

Jul. 19, 1984 [JP] Japan .................. 59-109144[U]

[51] Int. Cl.$^4$ ................................................ G11B 5/54
[52] U.S. Cl. ...................................... 360/105; 360/60; 360/109
[58] Field of Search ............... 360/105, 118, 60, 96.1, 360/96.5, 76, 109

[56] References Cited

U.S. PATENT DOCUMENTS

| | | | |
|---|---|---|---|
| 3,768,814 | 10/1973 | Sato | 360/105 X |
| 3,800,327 | 3/1974 | Okita et al. | 360/105 |
| 4,010,493 | 3/1977 | Cicatelli | 360/109 X |
| 4,050,088 | 9/1977 | Okuda | 360/105 X |
| 4,056,835 | 11/1977 | Whitney et al. | 360/105 |
| 4,106,064 | 8/1978 | Hoshido | 360/60 |
| 4,206,488 | 6/1980 | Nakayama et al. | 360/96.1 |
| 4,661,865 | 4/1987 | Ida et al. | 360/137 |

*Primary Examiner*—Stuart N. Hecker
*Assistant Examiner*—Andrew L. Sniezek
*Attorney, Agent, or Firm*—Lewis H. Eslinger; Alvin Sinderbrand

[57] ABSTRACT

A cassette tape recording and reproducing apparatus comprises a first movable head support that takes selectively an operative position in which it causes a recording and reproducing head supported thereby to come into contact with a tape contained in a tape cassette through an opening formed in a case of the tape cassette and an inoperative position in which it holds the recording and reproducing head on the outside of the tape cassette. A second movable head support takes selectively a first position in which it causes an erase head supported thereby to come into contact with the tape contained in the tape cassette through the opening formed in the case of the tape cassette together with the recording and reproducing head and a second position in which it holds the erase head on the outside of the tape cassette. A first operational mode selector sets a reproducing operational mode by causing the first and second movable head supports to take the operative position and the second position, respectively. A second operational mode selector sets a recording operational mode by causing the first and second movable head supports to take the operative position and the first position, respectively.

7 Claims, 6 Drawing Figures

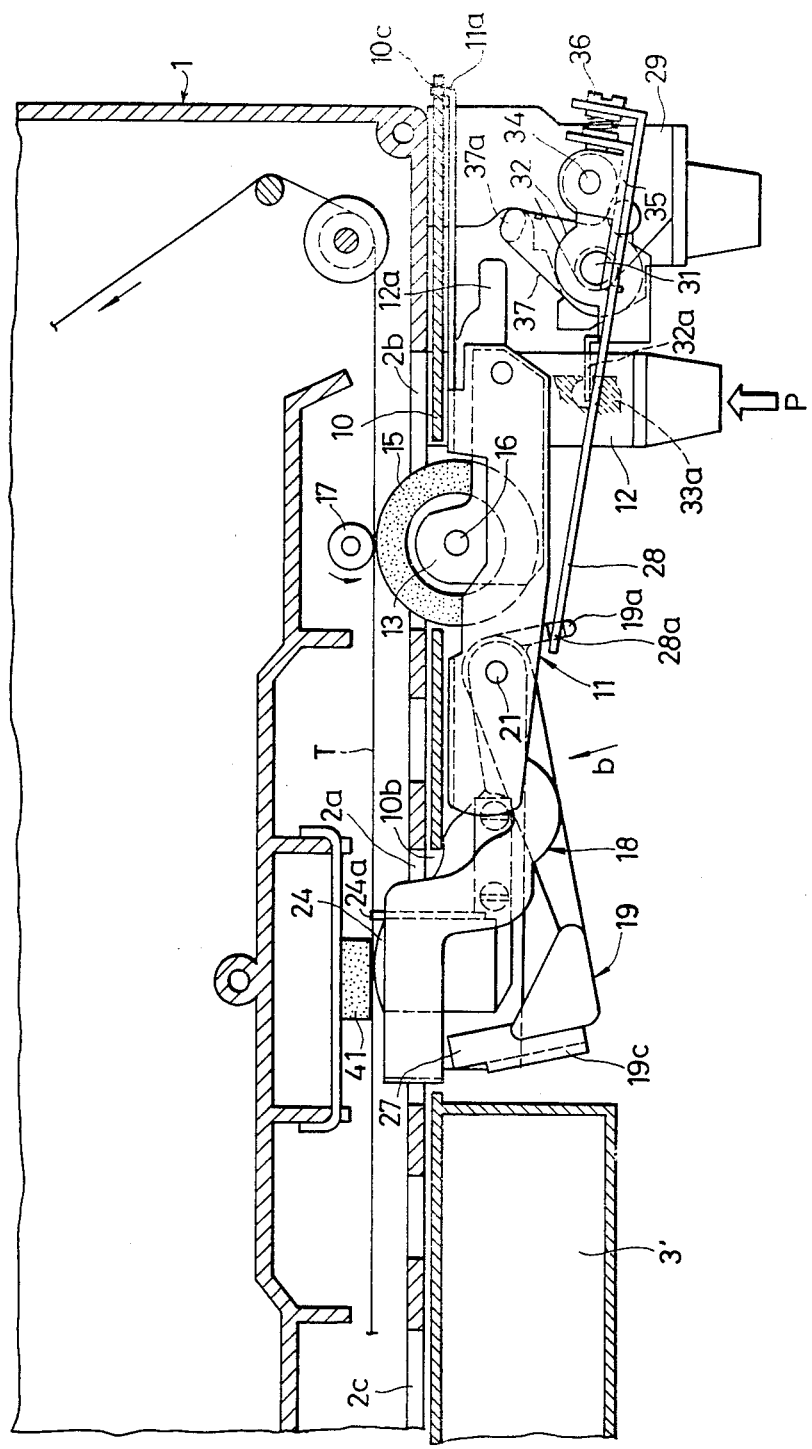

CASSETTE TAPE RECORDING AND REPRODUCING APPARATUS WITH COMPACT ARRANGEMENT OF MAGNETIC HEADS

BACKGROUND OF THE INVENTION

1. Field of the Invention

The present invention relates generally to cassette tape recording and reproducing apparatus working with compact tape cassettes, and more particularly to a portable cassette tape recording and reproducing apparatus which is miniaturized and light in weight so as to be handy to carry.

2. Description of the Prior Art

There has been proposed a cassette tape recording and reproducing apparatus which works with a cassette tape contained in a usual compact tape cassette for recording and reproducing an audio signal and has the external dimensions thereof reduced to be suitable for a portable apparatus. The compact tape cassette used with such a cassette tape recording and reproducing apparatus has the appearance as shown in FIG. 1 of the accompanying drawings. As shown in FIG. 1, the compact tape cassette has a case 1 which is provided on a side wall thereof with plural openings through which a tape T is sighted. These openings include three relatively large openings 2a, 2b and 2c among which the opening 2a is located between the openings 2b and 2c.

For recording or reproduction of a signal, the compact tape cassette shown in FIG. 1 is loaded on the cassette tape recording and reproducing apparatus in such a manner that the tape T is driven to run, for example, in the direction indicated with an arrow a in FIG. 1. In the signal recording operation, a recording and reproducing head device, a pinch roller operative to drive the tape T and an erasing head device, each provided in the cassette tape recording and reproducing apparatus, are inserted into the opening 2a at the center, the opening 2b at the right side and the opening 2c at the left side, respectively. On the other hand, in the signal reproducing operation, although the recording and reproducing head device and the pinch roller are inserted into the opening 2a at the center and the opening 2b at the right side, respectively, the erasing head device is not inserted into the opening 2c at the left side, so that the opening 2c is not utilized. This means that, in the case where the compact tape cassette as shown in FIG. 1 is loaded on a cassette tape player which is constituted to be a reproducing apparatus, the opening 2c formed in the case of the compact tape cassette is never utilized.

Accordingly, in connection with the cassette tape player constituted to be a reproducing apparatus, it has been proposed to place a certain structural component, such as a battery pack 3 as shown with a dot-dash line in FIG. 1, at a position where the structural component faces the opening 2c of the compact tape cassette loaded on the player, in order to make good use of a space in the player and thereby to miniaturize more the external dimensions of the player.

For a miniaturized cassette tape player which is provided with a structural component such as a battery pack placed to face a specific one of large openings formed in the case of the compact tape cassette loaded thereon, it is also desired to have an erasing head device in addition to a recording and reproducing head device so as to be capable of assuming a recording operational mode for recording a signal on a tape contained in the compact tape cassette. However, in the case of such a miniaturized cassette tape player, there is a difficulty that the erasing head device can not be provided so as to be inserted into the specific large opening formed in the case of the compact tape cassette loaded on the player because the structural component such as the battery pack is placed to face that specific large opening. Because of this, a previously proposed miniaturized cassette tape player which has a structural component, such as the battery pack, placed so as face to a specific one of large openings formed on the case of the compact tape cassette loaded thereon, is not given the erasing head and therefore can not assume the recording operational mode.

OBJECTS AND SUMMARY OF THE INVENTION

Accordingly, it is an object of the present invention to provide a cassette tape recording and reproducing apparatus which avoids the foregoing disadvantage inherent in the above mentioned miniaturized cassette tape player proposed previously.

Another object of the present invention is to provide a cassette tape recording and reproducing apparatus in which a space which is to face a specific one of openings formed in the case of a tape cassette loaded thereon is effectively utilized to miniaturize the external dimensions and an erasing head is provided in addition to a recording and reproducing head so that a recording operational mode and a reproducing operational mode can be selectively assumed.

According to an aspect of the present invention, there is provided a cassette tape recording and reproducing apparatus which comprises recording and reproducing head means, erasing head means, first movable support means for supporting the recording and reproducing head means and making a movement to take selectively an operative position for causing the recording and reproducing head means to come into contact with a tape contained in a tape cassette loaded in the apparatus through an opening formed on a case of the tape cassette and an inoperative position for holding the recording and reproducing head means at the outside of the tape cassette, second movable support means for supporting the erasing head means and making a movement to take selectively a first position for causing the erasing head means to come into contact with the tape contained in the tape cassette loaded on the apparatus through the opening formed on the case of the tape cassette together with the recording and reproducing head means and a second position for holding the erasing head means at the outside of the tape cassette, first operational mode selecting means for setting a reproducing operational mode by causing the first and second movable support means to take the operative position and the second position, respectively, and second operational mode selecting means for setting a recording operational mode by causing the first and second movable support means to take the operative position and the first position, respectively.

In the cassette tape recording and reproducing apparatus thus constituted in accordance with the present invention, the recording and reproducing head means supported by the first movable support means and the erasing head means supported by the second movable support means are inserted into a common one of openings formed in the case of a tape cassette loaded on the apparatus in order to come into contact with the tape contained in the tape cassette when the recording operational mode is set by the second operational mode selecting means. Therefore, the cassette tape recording and reproducing apparatus according to the present invention is capable of assuming selectively and properly the reproducing operational mode and the recording operational mode without utilizing another of the openings formed in the case of the tape cassette, into which an erasing head device is to be inserted in case of the recording operational mode assumed in a previously proposed cassette tape recording and reproducing apparatus, and further capable of having the external dimensions miniaturized by utilizing effectively a space which is to face that another of the openings, for example, in the same manner as the foregoing miniaturized cassette tape player.

The above, and other objects, features and advantages of the present invention will become apparent from the following detailed description which is to be read in conjunction with the accompanying drawings.

BRIEF DESCRIPTION OF THE DRAWINGS

FIGS. 5 and 6 are illustrations used for explaining the operation of the essential part of the embodiment shown in FIG. 2.

DESCRIPTION OF THE PREFERRED EMBODIMENT

Now, one embodiment of cassette tape recording and reproducing apparatus according to the present invention will be described in detail with reference to the accompanying drawings hereinafter.

Figure 1:
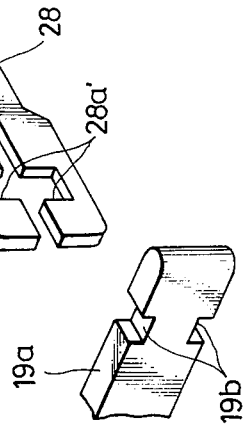
FIG. 1 is a perspective view showing the exterior of a compact tape cassette.
Figure 3:
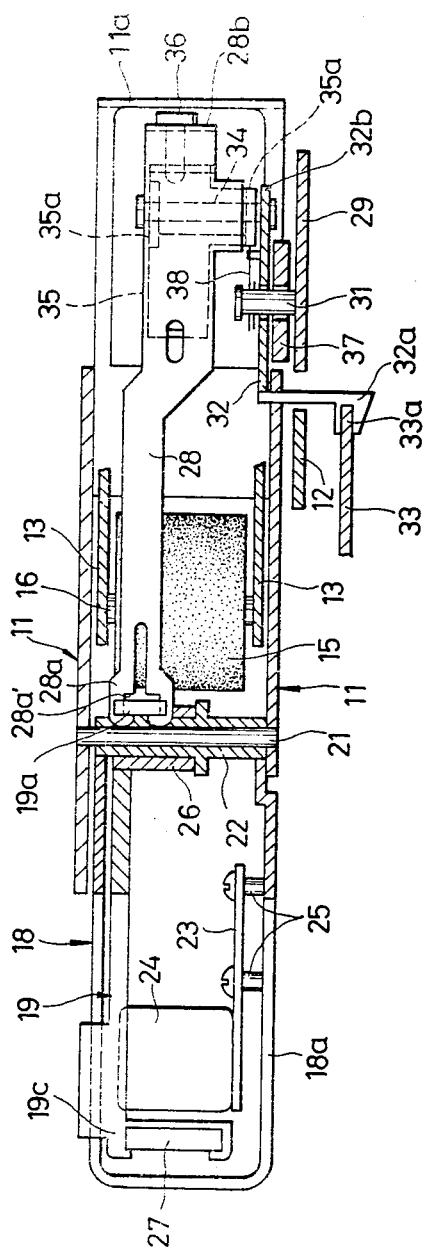
FIG. 3 is a sectional view of the essential part of the embodiment shown in FIG. 2.
Figure 2:
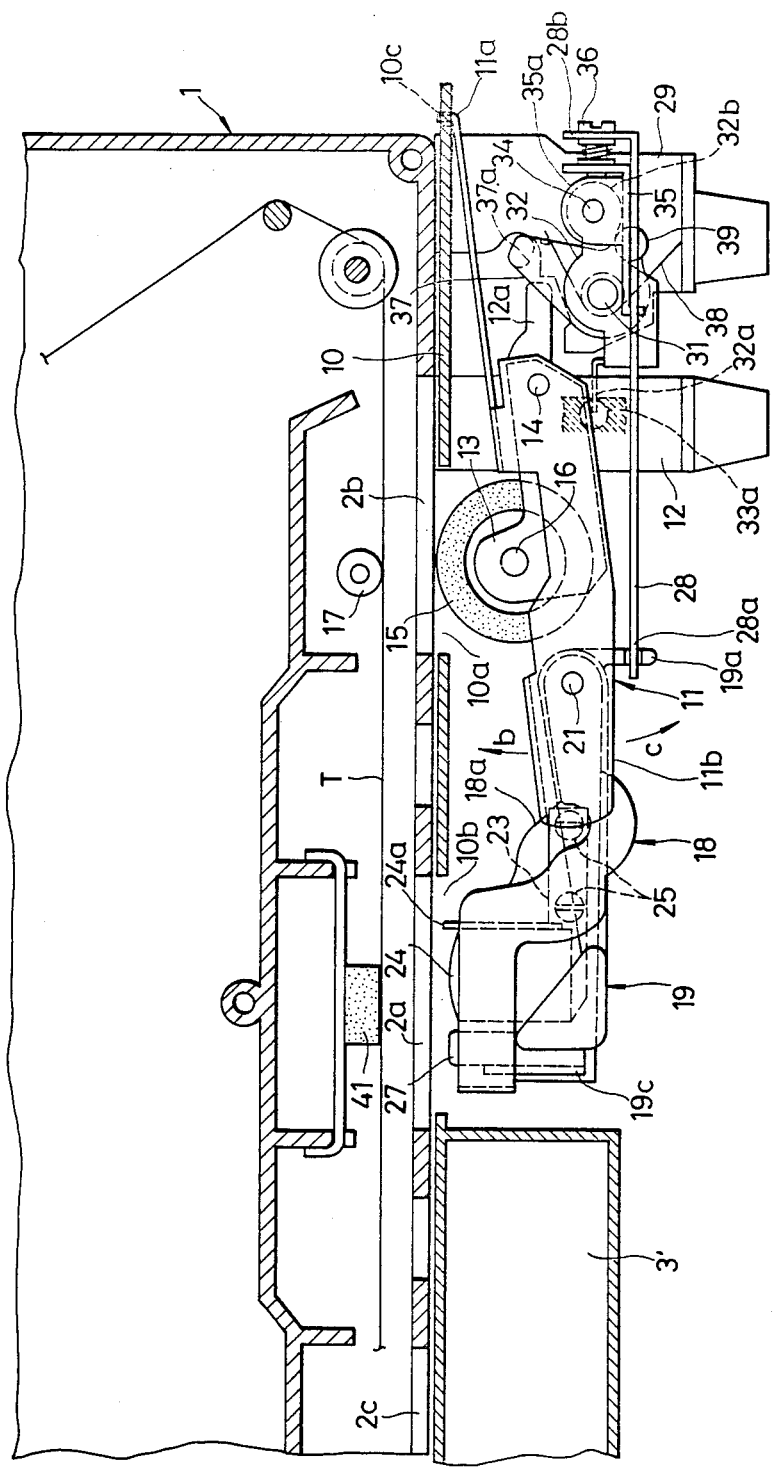
FIG. 2 is a plan view showing an essential part of one embodiment of cassette tape recording and reproducing apparatus according to the present invention, together with a fragmental section of a tape cassette loaded therein.

FIGS. 2 and 3 show an essential part of the embodiment of cassette tape recording and reproducing apparatus according to the present invention. In FIG. 2, the essential part of the embodiment is shown together with a part of such a compact tape cassette having a tape therein as shown in FIG. 1, which is loaded in the cassette tape recording and reproducing apparatus.

In this embodiment, a wall-shaped portion 10 of a chassis is provided so as to face the side wall of a case 1 of the compact tape cassette on which plural openings including three relatively large openings 2a, 2b and 2c are formed and in which a tape T is contained. On the wall-shaped portion 10 of the chassis, a main movable arm member 11 is supported at one end portion 11a thereof so as to be rotatable in the directions indicated by arrows b and c in FIG. 2. To be concrete, an engaging projection provided at one end portion 11a of the main movable arm member 11 is inserted into a slit 10c provided on the wall-shaped portion 10 of the chassis so that the main movable arm member 11 is able to be swung with a fulcrum at the position of the slit 10c. The main movable arm member 11 is so arranged that rotation thereof is caused in response to the movement of a playing operational mode selector 12 which is provided to be pushed in toward the wall-shaped portion 10 of the chassis.

A roller arm member 13 is supported to be rotatable about a shaft 14 at the central portion of the main movable arm member 11 and a pinch roller 15 is mounted to be free to rotate about an axle 16 supported by the end portion of the roller arm member 13. The roller arm member 13 is biased by a spring member, which is not shown in the drawings, to tend to rotate around the shaft 14 in the clockwise direction in FIG. 2 and restrained from rotating by a limiting member, which is also not shown in the drawings, to be normally at a stationary position as shown in FIG. 2. The pinch roller 15 is inserted into the opening 2b formed in the case 1 of the compact tape cassette through a cutout 10a provided in the wall-shaped portion 10 of the chassis to come into contact with a tape T contained in the case 1 of the compact tape cassette when the main movable arm member 11 is rotated in the direction of the arrow b. At this time, the tape T is pinched between the pinch roller 15 and a capstan 17, which is inserted in the case 1 of the compact tape cassette and rotated to drive the tape T, and driven to run along a path indicated with a heavy solid line in FIG. 2.

On the other end portion 11b of the main movable arm member 11, a couple of subsidiary movable arm members 18 and 19 are mounted to be rotatable individually about a shaft 21. The subsidiary movable arm member 18 is formed in the shape of ] in its entirety, as shown in FIG. 3, and supported through a bearing member 22 by the shaft 21. A head supporting plate 23 is attached on a lower plate portion 18a of the subsidiary movable arm member 18 with a couple of adjustable screws 25, and a recording and reproducing head device 24 which is accompanied with a tape guide member 24a and used for recording a signal on a tape and reproducing a signal from a tape is mounted on the head supporting plate 23. The gap azimuth of the recording and reproducing head device 24 can be adjusted by turning the adjustable screws 25. In such a manner as mentioned above, the main movable arm member 11 and the subsidiary movable arm member 18 act in a body as a movable support member for supporting and moving the recording and reproducing head device 24.

The subsidiary movable arm member 18 is also biased by a spring member, which is not shown in the drawings, to tend to rotate around the shaft 21 in the clockwise direction in FIG. 2 and restrained from rotating by a limiting member, which is also not shown in the drawings, normally to assume a stationary position as shown in FIG. 3 so as to move together with the main movable arm member 11. The recording and reproducing head device 24 is inserted into the opening 2a formed on the case 1 of the compact tape cassette through a cutout 10b provided in the wall-shaped portion 10 of the chassis to come into contact with the tape T contained in the case 1 of the compact tape cassette, together with the tape guide member 24a, when the subsidiary movable arm member 18 is moved in accordance with the rotation of the main movable arm member 11 in the direction indicated with the arrow b in FIG. 2.

In the meantime, the subsidiary movable arm member 19 is supported at one end portion thereof through a bearing member 26 by the shaft 21. To the other end portion 19c of the subsidiary movable arm member 19, an erasing head device 27 which is made of, for example, permanent magnet with relatively small size and used for erasing a signal recorded on a tape is attached.

Namely, the subsidiary movable arm member 19 acts as a movable support member for supporting and moving the erasing head device 27.

The subsidiary movable arm member 19 is linked through a linking plate member 28 with a recording operational mode selector 29, which is provided to be pushed in toward the wall-shaped portion 10 of the chassis. In detail, as shown in FIG. 3, a pin 31 is planted on the recording operational mode selector 29 and a connecting arm member 32 is pivoted on the pin 31 to connect the linking plate member 28 with the recording operational mode selector 29. One end portion 32a of the connecting arm member 32 engages to be rotatable with an engaging portion 33a provided on a floor portion 33 of the chassis, and a pillar 34 is planted on the other end portion 32b of the connecting arm member 32. A pair of engaging portions 35a projecting in parallel with each other from a subsidiary linking plate member 35 which engages with the linking plate member 28 are supported by the pillar 34 to be rotatable.

Figure 4:
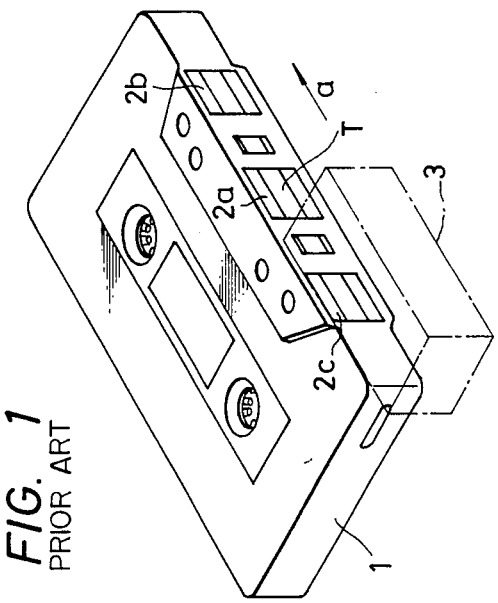
FIG. 4 is an exploded perspective view used for explaining the structure of a portion of the essential part of the embodiment shown in FIG. 2.

With this arrangement, when the connecting arm member 32 is rotated around the pin 31 planted on the recording operational mode selector 29, the linking plate member 28 is moved in accordance with the rotation of the connecting arm member 32. One end portion 28a of the linking plate member 28 engages with an engaging projection 19a provided at one end portion of the subsidiary movable arm member 19. For this engagement, as shown in the exploded manner in FIG. 4, a pair of cutouts 19b and another pair of cutouts 28a' are provided at the engaging projection 19a and one end portion 28a of the linking plate member 28, respectively, and each of the cutouts 28a' engages with a corresponding one of the cutouts 19b, so that the subsidiary movable arm member 19 is linked with the linking plate member 28.

In the configuration mentioned above, the subsidiary movable arm member 19 takes usually such a position as shown in FIG. 2 without being rotated in relation to the subsidiary movable arm member 18, so that the erasing head device 27 is close to the recording and reproducing head device 24. When the engaging projection 19a provided on one end portion of the subsidiary movable arm member 19 is moved to rotate around the shaft 21 in the counterclockwise direction in FIG. 2 by one end portion 28a of the linking plate member 28, the subsidiary movable arm member 19 is rotated around the shaft 21 in the counterclockwise direction in FIG. 2 in relation to the subsidiary movable arm member 18, so that the erasing head device 27 is moved to go away from the recording and reproducing head device 24.

Then, when the main movable arm member 11 is rotated in the direction indicated by the arrow b in FIG. 2 and at that time the subsidiary movable arm member 19 is not rotated in relation to the subsidiary movable arm member 18 so as to keep the erasing head device 27 close to the recording and reproducing head device 24, the erasing head device 27 is inserted into the opening 2a formed in the case 1 of the compact tape cassette through the cutout 10b provided in the wall-shaped portion 10 of the chassis, together with the recording and reproducing head device 24, to come into comtact with the tape T in the case 1 of the contact tape cassette. Further, when the main movable arm member 11 is rotated in the direction indicated by the arrow b in FIG. 2 and at that time the subsidiary movable arm member 19 is rotated around the shaft 21 in the counterclockwise direction in FIG. 2 in relation to the subsidiary movable arm member 18 so as to cause the erasing head device 27 to be apart from the recording and reproducing head device 24, the recording and reproducing head device 24 is inserted into the opening 2a formed in the case 1 of the compact tape cassette, but the erasing head device 27 is not inserted into the opening 2a formed in the case 1 of the compact tape cassette.

At the other end portion 28b of the linking plate member 28, an adjustable screw 36 engaging with the subsidiary linking plate member 35 is mounted. This adjustable screw 36 is provided for adjusting the position of the subsidiary movable arm member 19 in relation to the main movable arm member 11 so that the condition of contact between the erasing head device 27 and the tape T in the case 1 of the compact tape cassette is controlled. When the adjustable screw 36 is screwed in, the linking plate member 28 is moved along the subsidiary linking plate member 35 to the left in FIG. 2 to rotate the subsidiary movable arm member 19 slightly around the shaft 21 in the clockwise direction in FIG. 2, so that the erasing head device 27 is slightly advanced to be closer to the tape T. To the contrary, when the adjustable screw 36 is loosed, the erasing head device 27 is slightly moved back to be further from the tape T.

Further, a locking plate member 37 is mounted to be rotatable about the pin 31 on the recording operational mode selector 29. This locking plate member 37 is biased by a spring member 38 to tend to rotate in the counterclockwise direction in FIG. 2, but held usually at such a position as shown in FIG. 2 by a pin 39 provided thereon for engaging with the connecting arm member 32. The locking plate member 37 has a locking boss 37a projecting downward therefrom. When the recording operational mode selector 29 is pushed in and thereby the locking plate member 37 is rotated around the pin 31 in the counterclockwise direction in FIG. 2, the locking boss 37a engages with a projection 12a elongating from the playing operational mode selector 12 which is maintained in the pushed in position, so that the recording operational mode selector 29 is locked to be kept in the pushed in position. In such a case, the playing operational mode selector 12 is locked to be kept in the pushed in position by a known mechanism which is not shown in the drawings.

As described above, both the recording and reproducing head device 24 and the erasing head device 27 are inserted in common into the opening 2a formed in the case 1 of the compact tape cassette when they come into contact with the tape T contained in the compact tape cassette and the opening 2c also formed in the case 1 of the compact tape cassette is not utilized. Accordingly, in this embodiment, a battery container 3' is placed in a space facing the opening 2c so as to make good use of the space.

Next, the operation of this embodiment will be explained with reference to FIGS. 5 and 6.

When the reproducing operational mode for reproducing a signal recorded on the tape T contained in the case 1 of the compact tape cassette is selected, the playing operational mode selector 12 is pushed in as indicated by an arrow P in FIG. 5 to move into the pushed in position as shown in FIG. 5 from the position shown in FIG. 2 and locked to be kept in the pushed in position. In accordance with the movement of the playing operational mode selector 12 to be pushed in, the main movable arm member 11 and the subsidiary movable arm member 18 are rotated in a body in the direction of the arrow b with the fulcrum at the position of the slit 10c in which one end portion 11a of the main movable arm member 11 is inserted. With this rotation, the subsidiary movable arm member 18 is moved to approach the case 1 of the compact tape cassette, and the recording and reproducing head device 24 is inserted into the opening 2a formed in the case 1 of the compact tape cassette through the cutout 10b provided on the wall-shaped portion 10 of the chassis to come into contact with the tape T contained in the case 1 of the compact tape cassette. The tape T is put between the recording and reproducing head device 24 and a pressure pad 41 provided in the case 1 for supporting the tape T. The subsidiary movable arm member 18 is finally bent slightly, against the spring member which is biasing the subsidiary movable arm member 18 as aforementioned, at the position of the shaft 21 in relation to the main movable arm member 11, as shown in FIG. 5, so that the contacting surface of the recording and reproducing head device 24 is in proper contact with the tape T. Further, in this time, the pinch roller 15 is inserted into the opening 2b formed also in the case 1 of the compact tape cassette and the tape T is pinched between the pinch roller 15 and the capstan 17 to be driven to run by the capstan 17.

In this situation, since the recording operational mode selector 29 is not pushed in, the engaging projection 19a provided on one end portion of the subsidiary movable arm member 19 is moved to rotate around the shaft 21 in the counterclockwise direction in FIG. 5 by one end portion 28a of the linking plate member 28, and therefore the subsidiary movable arm member 19 by which the erasing head device 27 is supported is rotated around the shaft 21 in the counterclockwise direction in FIG. 5 in relation to the subsidiary movable arm member 18. Accordingly, the erasing head device 27 is moved to go away from the recording and reproducing head device 24 and is not inserted into the opening 2a formed in the case 1 of the compact tape cassette.

Figure 6:
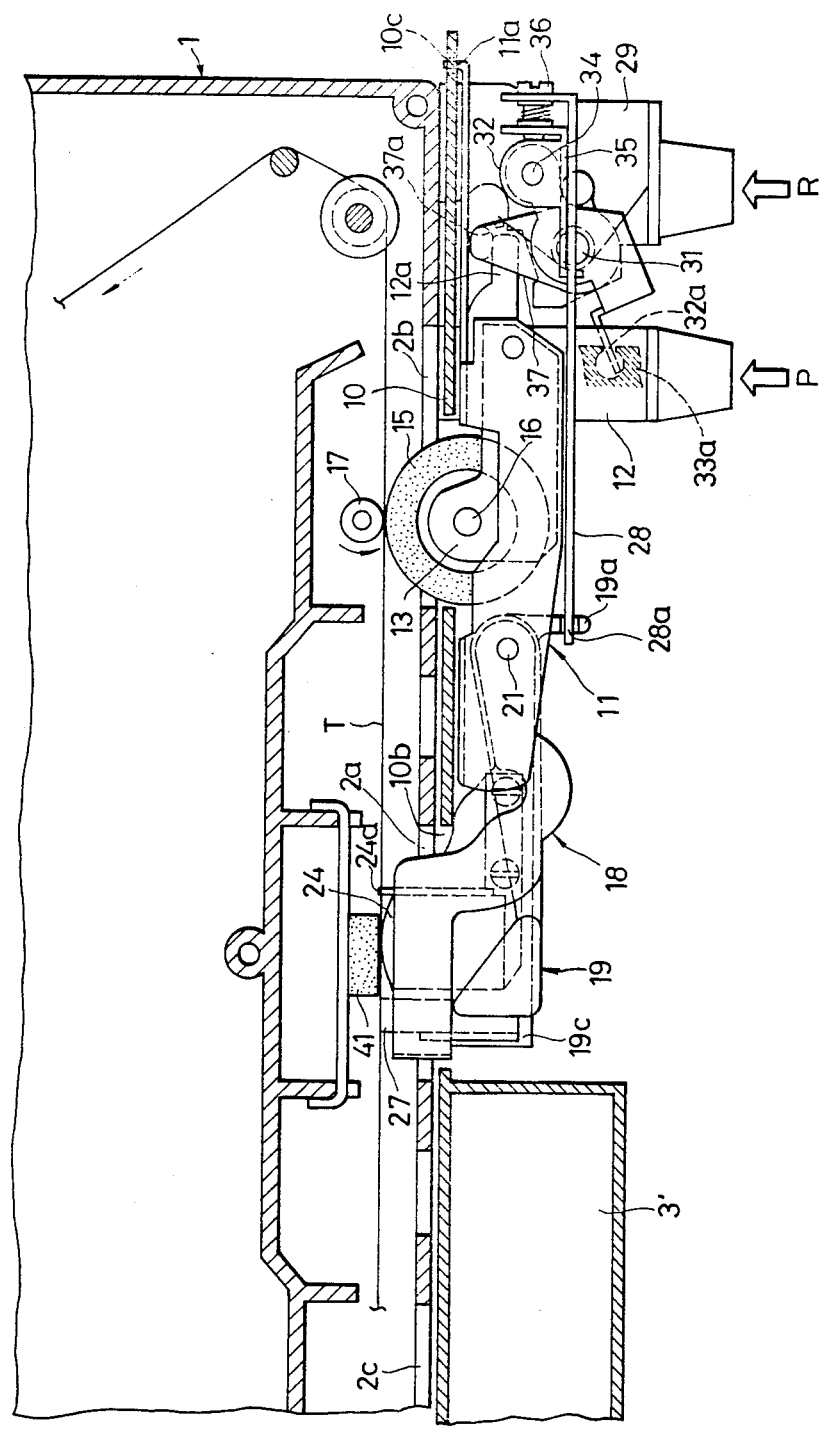

In the meantime, when the recording operational mode for recording a signal on the tape T contained in the case 1 of the compact tape cassette is selected, as shown in FIG. 6, the playing operational mode selector 12 is pushed in as indicated by the arrow P and locked to be kept in the pushed in position, and the recording operational mode selector 29 is also pushed in as indicated by an arrow R. In this case, since the playing operational mode selector 12 is kept in the pushed in position, both the main movable arm member 11 and the subsidiary movable arm member 18 are rotated so that the subsidiary movable arm member 18 is moved to approach the case 1 of the compact tape cassette, and the recording and reproducing head device 24 is inserted into the opening 2a formed in the case 1 of the compact tape cassette to come into contact with the tape T contained in the case 1 of the compact tape cassette. Further, the pinch roller 15 is also inserted in the opening 2b formed in the case 1 of the compact tape cassette and the tape T is pinched between the pinch roller 15 and the capstan 17 to be driven to run by the capstan 17. In addition, since the recording operational mode selector 29 is pushed in as shown with the arrow R in FIG. 6, the linking plate member 28 is shifted in its entirety toward the case 1 of the compact tape cassette without being rotated and thereby the engaging projection 19a provided on one end portion of the subsidiary movable arm member 19 is not rotated around the shaft 21 on the main movable arm member 11.

Accordingly, the subsidiary movable arm member 19 is not rotated around the shaft 21 in relation to the subsidiary movable arm member 18, but moved to approach the case 1 of the compact tape cassette together with the subsidiary movable arm member 18. As a result of this, the erasing head device 27 is kept in the position close to the recording and reproducing head device 24 and inserted into the opening 2a formed in the case 1 of the compact tape cassette through the cutout 10b provided in the wall-shaped portion 10 of the chassis, together with the recording and reproducing head device 24, to come into contact with the tape T in the case 1 of the compact tape cassette.

Further, in this case, the locking plate member 37 is rotated around the pin 31 in the counterclockwise direction in FIG. 6 and the locking boss 37a projecting from the locking plate member 37 engages with the projection 12a elongating from the playing operational mode selector 12 kept in the pushed in position. Consequently, the recording operational mode selector 29 is locked to be kept in the pushed in position and the recording operation is performed.

After the recording operation is completed, both the playing operational mode selector 12 and the recording operational mode selector 29 are released from the respective pushed in positions and put back to the positions shown in FIG. 2, respectively, by a releasing mechanism which is omitted from the drawings.

What is claimed is:

1. A cassette tape recording and reproducing apparatus, comprising:
    recording and reproducing head means for recording a signal on a tape and reproducing a signal from a tape,
    erasing head means for erasing a signal recorded on a tape,
    first movable support means for supporting said recording and reproducing head means and making a movement to take selectively an operative position for casuing said recording and reproducing head means to come into contact with a tape contained in a tape cassette loaded in the apparatus through an opening formed in a case of the tape cassette and an inoperative position for holding said recording and reproducing head means on the outside of the tape cassette,
    second movable support means for supporting said erasing head means and making a movement to take selectively a first position for causing said erasing head means to come into contact with the tape contained in the tape cassette loaded in the apparatus through said opening formed in the case of the tape cassette together with said recording and reproducing head means and a second position for holding said erasing head means on the outside of the tape cassette,
    first operational mode selecting means for setting a reproducing operational mode by causing said first and second movable support means to take said operative position and said second position, respectively, and
    second operational mode selecting means for setting a recording operational mode by causing said first and second movable support means to take said operative position and said first position, respectively,
    wherein said first movable support means comprises a main movable arm member supported at one end portion thereof to be rotatable by a stationary portion on a chassis of the apparatus and a subsidiary movable arm member mounted on said main movable arm member and provided thereon with said recording and reproducing means, wherein said second movable support means comprises an additional movable arm member mounted to be rotatable on said main movable arm member and provided thereon with said erasing head means, and wherein said subsidiary movable arm member and said additional movable arm member are supported to be rotatable individually about a common shaft provided on said main movable arm member.

2. A cassette tape recording and reproducing apparatus, comprising:

recording and reproducing head means for recording a signal on a tape and reproducing a signal from a tape, erasing head means for erasing a signal recorded on a tape, first movable support means for supporting said recording and reproducing head means and making a movement to take selectively an operative position for causing said recording and reproducing head means to come into contact with a tape contained in a tape cassette loaded in the apparatus through an opening formed in a case of the tape cassette and an inoperative position for holding said recording and reproducing head means on the outside of the tape cassette, second movable support means for supporting said erasing head means and making a movement to take selectively a first position for causing said erasing head means to come into contact with the tape contained in the tape cassette loaded in the apparatus through said opening formed in the case of the tape cassette together with said recording and reproducing head means and a second position for holding said erasing head means on the outside of the tape cassette, first operational mode selecting means for setting a reproducing operational mode by causing said first and second movable support means to take said operative position and said second position, respectively, second operational mode selecting means for setting a recording operational mode by causing said first and second movable support means to take said operative position and said first position, respectively, wherein said first movable support means comprises a main movable arm member supported at one end portion thereof to be rotatable by a stationary portion on a chassis of the apparatus and a subsidiary movable arm member mounted on said main movable arm member and provided thereon with said recording and reproducing means, wherein said second movable support means comprises an additional movable arm member mounted to be rotatable on said main movable arm member and provided thereon with said erasing head means, wherein said first operational mode selecting means comprises a playing operational mode selector operative to take a shifted position for shifting said main and subsidiary movable arm members together to a position close to the tape cassette and keeping them in said position close to the tape cassette, and wherein said second operational mode selecting means comprises a recording operational mode selector operative to move independently of said playing operational mode selector, and linking means for linking said additional movable arm member with said recording operational mode selector in order to control the position of said additional movable arm member in relation to said main movable arm member in response to the movement of said recording operational mode selector, said linking means shifting said additional movable arm member to a position close to the tape cassette when said recording operational mode selector takes a moved position, wherein said subsidiary movable arm member and said additional movable arm member are supported to be rotatable individually about a common shaft provided on said main movable arm member.

3. A cassette tape recording and reproducing apparatus according to claim 2, wherein said linking means comprises an elongate linking member, first connecting means for connecting one end portion of said elongate linking member with said additional movable arm member, and second connecting means for connecting the other end portion of said elongate linking member with said recording operational mode selector.

4. A cassette tape recording and reproducing apparatus according to claim 3, wherein said first connecting means comprises an engaging portion provided on said additional movable arm member for engaging movably with one end portion of said elongate linking member.

5. A cassette tape recording and reproducing apparatus according to claim 3, wherein said second connecting means comprises a connecting arm member pivoted on said recording operational mode selector for connecting the other end portion of said elongate linking member to be rotatable with said recording operational mode selector.

6. A cassette tape recording and reproducing apparatus according to claim 5, wherein said second connecting means further comprises adjusting means for adjusting, through said elongate linking member, the position of said additional movable arm member in relation to said main movable arm member so that the position of said erasing head means relative to the tape contained in the tape cassette loaded on the apparatus is controlled.

7. A cassette tape recording and reproducing apparatus according to claim 2, wherein said recording operational mode selector is provided with locking means for engaging with said playing operational mode selector in said shifted position so as to maintain said recording operational mode selector in said moved position.

* * * * *

UNITED STATES PATENT AND TRADEMARK OFFICE
CERTIFICATE OF CORRECTION

PATENT NO. : 4,729,049

DATED : March 1, 1988

INVENTOR(S) : Hisaya Narita

It is certified that error appears in the above-identified patent and that said Letters Patent is hereby corrected as shown below:

Column 1, line 22, delete "as"

Column 5, line 40, change "subsidiarY" to --subsidiary--;

line 62, change "comtact" to --contact--;

line 63, change "contact" to --compact--.

Column 6, line 24, change "further" to --farther--;

line 51, after "cassette" insert --,--.

IN THE CLAIMS:

Column 8, line 40, change "casuing" to --causing--.

Column 10, line 42, change "claim 3" to --claim 4--.

Signed and Sealed this

Twenty-seventh Day of December, 1988

Attest:

DONALD J. QUIGG

Attesting Officer       Commissioner of Patents and Trademarks